(12) United States Patent
Strohmeier et al.

(10) Patent No.: US 7,127,332 B2
(45) Date of Patent: Oct. 24, 2006

(54) RETAINING ELEMENT FOR A PORTABLE COMPUTER DEVICE

(75) Inventors: Wolfgang Strohmeier, Hildesheim (DE); Jens Kellner, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 10/479,007

(22) PCT Filed: May 21, 2002

(86) PCT No.: PCT/DE02/01855

§ 371 (c)(1),
(2), (4) Date: Jun. 14, 2004

(87) PCT Pub. No.: WO02/094614

PCT Pub. Date: Nov. 28, 2002

(65) Prior Publication Data

US 2005/0018392 A1   Jan. 27, 2005

(30) Foreign Application Priority Data

May 23, 2001 (DE) ................................ 101 25 063

(51) Int. Cl.
*G01D 1/00* (2006.01)

(52) U.S. Cl. .............................. 701/1; 701/24; 701/36; 455/575.4; 108/44; 108/50.01

(58) Field of Classification Search .................... 701/1, 701/24, 32, 33, 36; 455/575.1, 575.4, 575.9
See application file for complete search history.

(56) References Cited

U.S. PATENT DOCUMENTS

| 5,279,488 A | * | 1/1994 | Fleming | ................... 248/279.1 |
| 5,673,628 A | * | 10/1997 | Boos | ........................... 108/44 |
| 5,769,369 A | * | 6/1998 | Meinel | .................... 248/176.1 |
| 6,032,910 A | * | 3/2000 | Richter | ..................... 248/274.1 |
| 6,169,665 B1 | | 1/2001 | Lepping et al. | ............. 361/800 |

FOREIGN PATENT DOCUMENTS

| DE | 42 28 605 | 3/1994 |
| DE | 198 03 178 | 7/1999 |
| DE | 198 48 361 | 5/2000 |
| EP | 1 081 579 | 3/2001 |
| WO | 98 39665 | 9/1998 |
| WO | 01 03981 | 1/2001 |

\* cited by examiner

*Primary Examiner*—Gertrude A. Jeanglaude
(74) *Attorney, Agent, or Firm*—Kenyon & Kenyon LLP

(57) ABSTRACT

A mounting support for a portable computing device is described, the mounting support being at least part of a drawer. The mounting support is mounted in a drawer that may be inserted an instrument panel of a motor vehicle. The mounting support is used for the secure accommodation and the simple operation of the computing device, particularly in a motor vehicle.

10 Claims, 3 Drawing Sheets

RETAINING ELEMENT FOR A PORTABLE COMPUTER DEVICE

FIELD OF THE INVENTION

The present invention concerns a mounting support for a portable computing device.

BACKGROUND INFORMATION

An operating element for an automobile radio device is described in German Published Patent Application No. 198 03 178, and is designed as a portable, so-called personal digital assistant (PDA). The PDA is used as a portable computer that allows data to be transmitted to the radio device, and which can be used for the storage of addresses and telephone numbers. Its operation is performed via a touch screen monitor, which is situated on the operating element. For the operation of the car radio, it is necessary to mount the operating element in a mounting support.

SUMMARY OF THE INVENTION

A mounting support according to the present invention for a portable computing device has the advantage that the mounting support is at least a part of a drawer, and the computing device is able to be covered up by pushing the drawer in. This ensures a secure mounting of a portable computer device in a motor vehicle, particularly during travel. As opposed to simply sticking a portable computing device onto a mounting support, the portable computing unit is safeguarded better against release out of the mounting support during a powerful acceleration or braking, such as in an accident. Furthermore, when the driver leaves the vehicle, and does not wish to take the computing device with him, the computing device is covered up by mounting it in the mounting support and the drawer is pushed in, which prevents temptation of theft. In addition, by mounting the device in a mounting support according to the present invention, a video screen and/or a keyboard of the computing device can be positioned in a more user-friendly manner, in comparison to an operating element that is attached from the front.

According to an embodiment of the present invention, the mounting support may be situated in a driver information device, such as a car radio. This makes it possible to input special functions of the driver information device via the computing device. In addition to the computing device, additional operating elements may be situated on the radio which also make possible operation without requiring the computing device to be mounted on the mounting support. This makes it possible to offer the computing device as an optional extra to the radio device, while operating just the radio functions or the driver information functions by further operating and display elements that are to be mounted on the driver information device. It is of particular advantage that the video screen and/or the keyboard of the computing device are situated on flaps which automatically open when the drawer is opened, and lock in a position that is convenient for the user. Even when the drawer is open, the computing device is well secured by being embedded in the supporting device.

The computing device may be controlled via operating elements positioned on the mounting support, for example, via operating elements of the car radio. This makes it possible for the functions of the portable computing device, which, for example, is implemented using PDA having a touch screen, to use the operating elements present on the car radio which makes for convenient operation during travel. Whereas, during normal use of the PDA, it is held in one hand and operated by the other hand, for instance, using an operating stylus. During driving, such positioning hand-held use is not possible, so that the operating knobs of the car radio simplify operation.

It is further advantageous to bring the computing device into a reading position convenient to the viewer when the drawer is opened, by suitable positioning means. This is particularly the case for a computing device which has no cover plate for a keyboard and has a display on its front side.

Furthermore, it is of advantage if the mounting support, fashioned as a drawer, is opened in a motor-actuated manner, so that the computing device may be conveniently removed.

DETAILED DESCRIPTION

A mounting support according to the present invention can securely hold portable computing devices in connection with many devices, e.g., in contact with other computing devices at desks and in vehicles. The present invention is explained below, in the context of a mounting support for a portable computing device in a motor vehicle. A drawer for accommodating a computing device may be positioned, in this context, at various places in the vehicle, such as in the center console. The drawer may be made in a conventional manner, such as of a plastic material, and need not have any additional functions besides accommodating the computing device. In an exemplary embodiment described in greater detail below, at least a part of a car radio is arranged as a drawer which is positioned as a mounting support according to the present invention, having a depression for a computing device.

Figure 1:
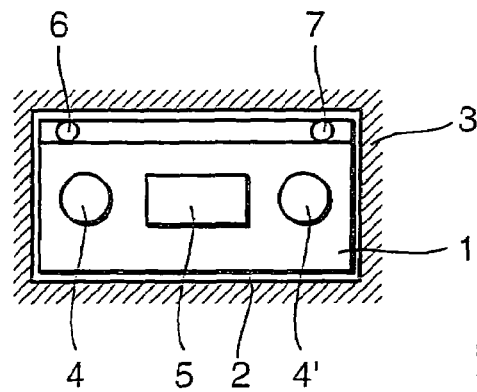
FIG. 1 shows a frontal view of an exemplary car radio according to an embodiment of the present invention.

FIG. 1 shows a frontal view of a car radio 1 which is situated in an installation compartment 2 in a middle console 3 between the driver position and the front-seat passenger position. Car radio 1 has an operating element 4, 4', by which are selected, among other things, the volume and a radio program to be played by car radio 1. The display of a station selected, of a volume, or of a selected station frequency is made in display 5, which may be situated between operating elements 4, 4' in car radio 1. Besides the car radio function, general functions of a driver information device may be integrated into car radio 1, such as a navigation function for guiding a vehicle in a road network, a contact to a data net, such as the Internet, using the call-up of data via the data net or the transmitting of electronic messages. In addition, a telephone device may be integrated into the car radio. On top of car radio 1 there is situated a microphone 6, which is used for verbal input for controlling car radio 1. There is also a pressure key 7 which leads to the opening of a drawer formed by car radio 1, via which car radio 1 slides out of installation compartment 2. Additional features such as tuner devices for converting an antenna signal into an audio signal, an amplifier circuit, and storage units for tranmitter storage or for other functions of a driver information device are not shown in FIG. 2, but may be integrated into car radio 1.

Figure 2:
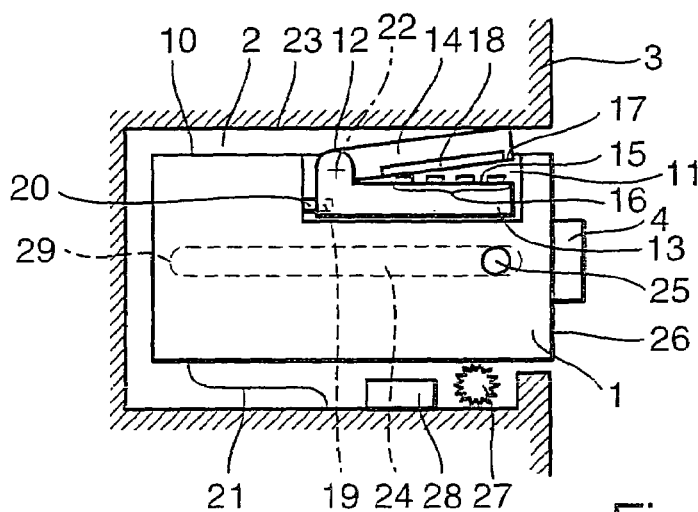
FIG. 2 shows a side view of a car radio having a computing device mounted in a mounting support in an installation compartment according to an embodiment of the present invention.

FIG. 2 shows a cross section through a car radio 1 as shown in FIG. 1. Here and in the following, identical reference numerals also designate identical elements. On upper side 10 of car radio 1 there is a depression 11 which acts as a mounting support for a computing device 12, whereby car radio 1 forms a drawer for giving mounting support to a computing device 12. Computing device 12 has a first flap 13 and a second flap 14. On a first side 15 of first flap 13 a keyboard 16 is situated. On second flap 14 a video screen 18 is situated on side 17 facing keyboard 16. Second flap 14 is supported opposite first flap 13 on a hinge 22. In a first exemplary embodiment, second flap 14 is braced opposite first flap 13 by a spring element such as a torsion spring situated in the hinge 22. Via the spring element, second flap 14 presses against a wall 23 of installation compartment 2. When the car radio is slid outwards in installation compartment 2, computing device 12 is guided via an edge of installation compartment 2, so that second flap 14 opens up from first flap 13. If computing device 12 is taken along by a user, then second flap 14 and first flap 13 can be held together by locking elements not shown in FIG. 2, for instance, a detent hook or magnets situated on a housing of computer device 12, in such a way that a spontaneous opening of second flap 14 vis-a-vis the first flap 13 is avoided. In a second exemplary embodiment, a motor, preferably an electric motor, is situated at hinge 22, and it moves second flap 14 with respect to first flap 13 as a function of a control signal of computing device 12. In the second exemplary embodiment, when the car radio is pushed into installation compartment 2, the second flap 14 lies flush on first flap 13.

In a particular exemplary embodiment, the computing device can also be operated by operating elements 4, 4'. On display 18 of the computing device, such an operating possibility is pointed out. In another exemplary embodiment, a switch-over is made automatically from controlling the car radio via operating knobs 4, 4' to the computing device after drawer 1 slides out and second flap 14 flaps open.

There is an electrical contact 19 on computing device 12 which is in contact with a second electrical contact 20, which is situated in depression 11 on car radio 1. Car radio 1 is connected to other components of the vehicle, e.g. vehicle sensors, using an antenna device or additional indicators in the vehicle, via an electrical connection 21, such as a flexible foil strip. A voltage supply is also provided via electrical connection 21. Thus, computing device 12 can be connected to the vehicle electronics via electrical contacts 19, 20. Electrical contacts 19, 20 are designed as plug contacts fitting each other which may latch into depression 11 when computing device 12 is plugged in, consequently fixing computing device 12 in depression 11. Via electrical contacts 19, 20, besides a data exchange, a voltage supply may be coupled to computing device, and/or a storage battery situated in computing device 12 may be loaded.

A guide rail 24 on car radio 1, allows car radio 1 to be movable with respect to a support 25, which is situated on a sidewall of installation compartment 2, perpendicular to a front panel 26 of car radio 1 in the outside direction from installation compartment 2. A movement takes place, for example, via a gear wheel drive 27, gear wheel drive 27 being driven by an electric motor. The sliding of car radio 1 out from installation compartment 2 can occur up to a predefined, programmed stop of gear wheel drive 27 or to a stop 29 of guide rail 24, if car radio 1 is out of the installation compartment. The sliding can be triggered by pressing push button 7 or using a voice input over microphone 6.

Figure 3:
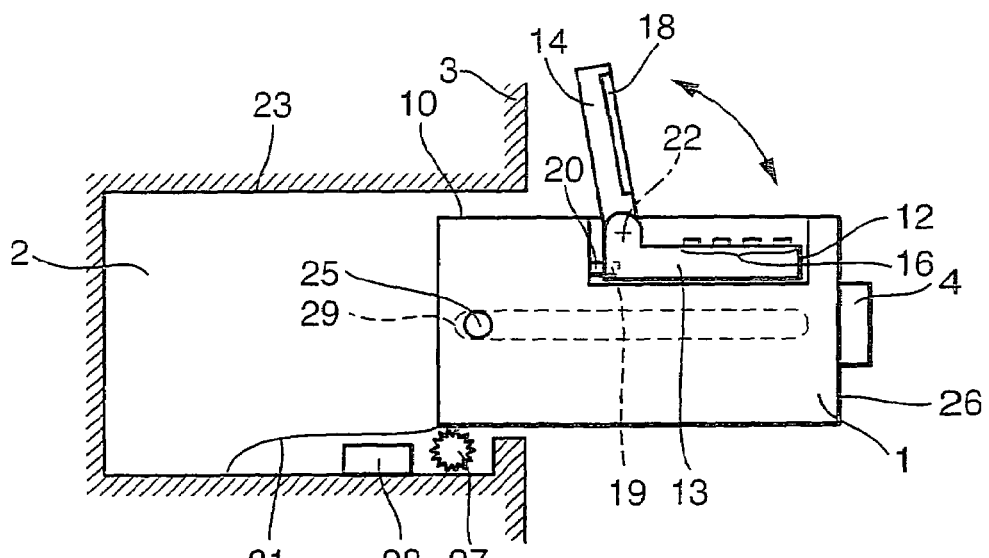
FIG. 3 shows the side view of the car radio as shown in FIG. 2, with the car radio partially drawn out of the installation compartment.

In FIG. 3 car radio 1 is shown with the car radio having slid at least partially out from the installation compartment. In depression 11, designed as mounting support for computing device 12, computing device 12 is operable via keyboard 16, a display of data taking place on video screen 18 of the computing device. Upon car radio sliding out, second flap 14 automatically opens, either mechanically or by an electrical control via first and second electrical contacts 19, 20. In one exemplary embodiment, second flap 14 latches in at an angle of approximately 120° to first flap 13, and thus makes possible to the user an optimal reading off from video screen 18, which may be implemented as a liquid crystal display. Electrical connections 21 are constructed to adapt to a changed position of car radio 1 with respect to installation compartment 2. By a renewed activation of pushbutton 7, or by a sufficient pressure on front panel 26 of car radio 1, an automatic, motor-activated withdrawal of car radio 1 into installation compartment 2 is triggered. In this context, the folding in of flap 14 is triggered either by a mechanical pressure through the wall of middle console 3, or by electrical activation. Car radio 1 is retracted into the position according to FIG. 2 in installation compartment 2. Car radio 1 consequently forms a drawer for computing device 12. In response to a retracted state of car radio 1, front panel 26 may close flush or nearly flush with middle console 3. Computing device 12 is then completely covered, so that it is not visible to an external viewer.

Figure 4:
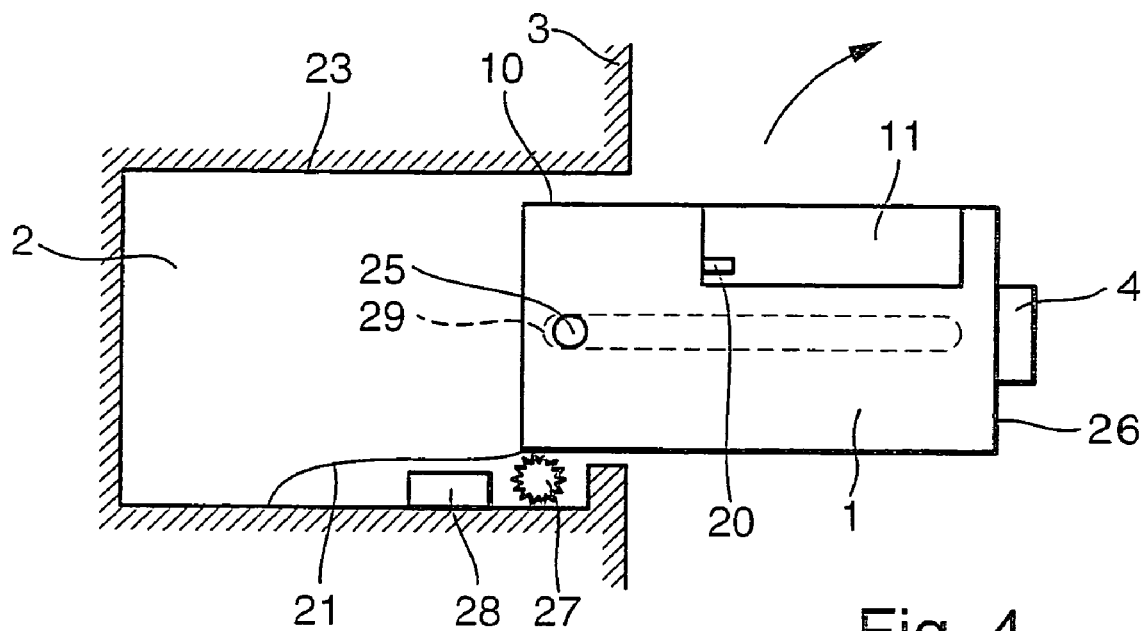
FIG. 4 shows the side view of the car radio as shown in FIG. 3 with the computing device taken out.

Computing device 12 may be taken from depression 11 and used as a portable computing device 12. In FIG. 4, car radio 1 is shown after computing device 12 is taken out. Operation of the car radio is now performed via operating elements 4, 4' situated on front panel 26 and display 5. Another computing device may possibly be inserted into depression 11 of car radio 1 at second electrical contacts 20.

In a further exemplary embodiment not shown in the drawing, a data medium drive is mounted under depression 11, so that a data medium drive may be inserted into car radio 1 before the insertion of computing device 12 into depression 11 of car radio 1. These drives may be magnetic and/or optical data storage media, such as a CD-ROM, a DVD or a magnetic tape. In a further exemplary embodiment, also not shown in the drawing, front panel 26 may be flipped upwards, and the data medium drive in this exemplary embodiment may be situated behind front panel 26, being accessible after the flipping of front panel 26, so that a data storage medium may be inserted, for instance, having music or navigation data.

Figure 5:
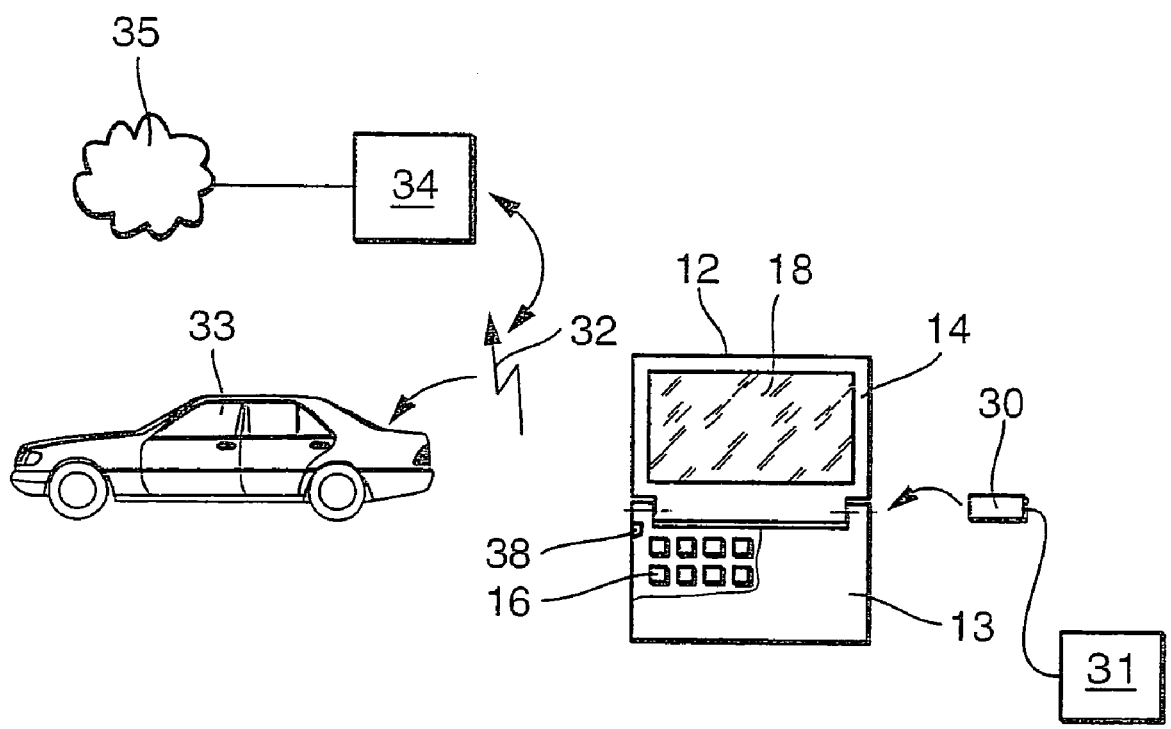
FIG. 5 shows a frontal view of an exemplary portable computing device according to the present invention during operation independent of the car radio.

FIG. 5 shows an operation of portable computing device 12 as an individual unit. Keyboard 16 may be an alphanumeric keyboard, corresponding to a typical computer keyboard or typewriter keyboard. Any computer unit 31, such as a typical computer having a video screen and a keyboard, can be connected to computing device 12 via an electrical plug contact 30, so that data from computer unit 31 can be transmitted to car radio 1 with the aid of computing device 12. Computing device 12 also has an integrated radio interface 32, which can produce a wireless radio connection to additional devices in vehicle 33, for instance via a blue tooth interface, which may provide a security function with respect to the door locks or the alarm system. Vehicle functions can also be monitored via radio by control units and/or vehicle sensors that can be queried through the radio interface 32 by computing device 12. Moreover, radio interface 32 permits contact, via a mobile radio connection, to a service center 34 which is connected to a data network 35, such as the Internet. This makes possible a data exchange between computing device 12 and the Internet. In this context, a text input is simple to operate via the alphanumeric keyboard, so that electronic messages are able to be simply input and subsequently transmitted to a receiver. In a further exemplary embodiment, a travel route may be planned on computer unit 31, which is then output to a driver in a driver information device developed as a navigation system or via a display 5 of the car radio according to FIG. 1.

The radio interface of computing device 12 may also be replaced or supplemented by an infrared interface, for which an infrared transmitter and receiver unit 36 can be mounted on computing device 12.

In a particular exemplary embodiment, car radio 1 is only operable by an inserted computing device, so that car radio 1 without the inserted computing device offers no incentive for theft.

Figure 6:
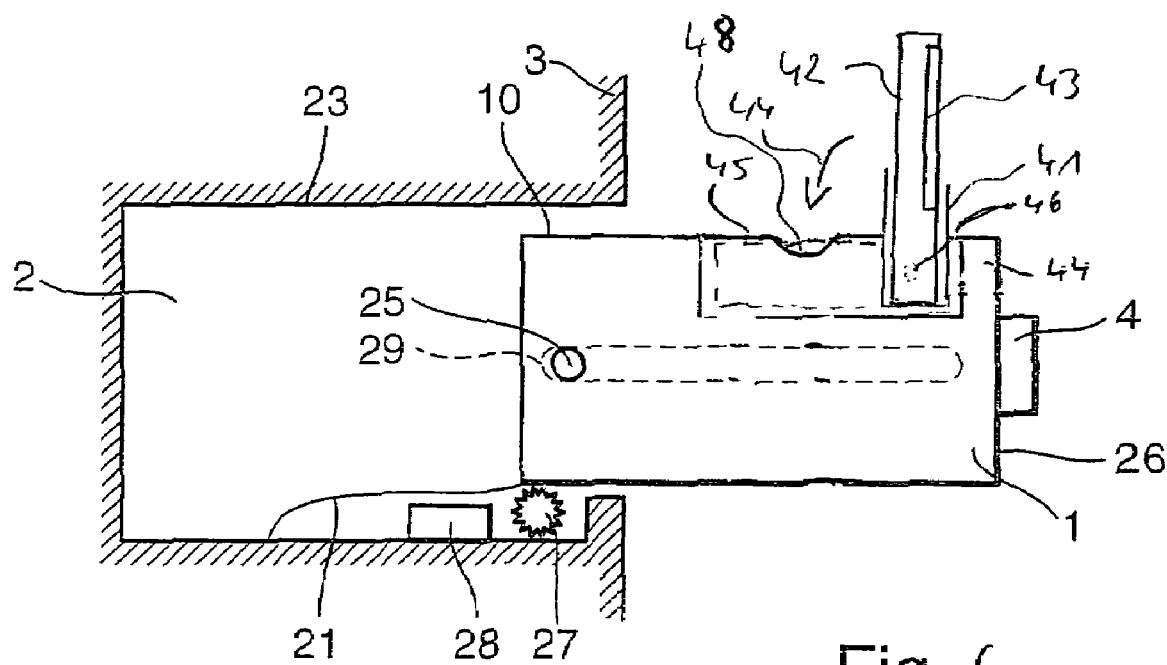
FIG. 6 shows a side view of an alternative embodiment of the car radio according to the present invention having a different arrangement of the mounting support of the computing device.

FIG. 6 shows an additional specific embodiment of a mounting support and a car radio according to the present invention. Car radio 1, in this context, corresponds to the exemplary embodiment explained in FIGS. 1 through 3, with the design of mounting support 44 mounted in car radio 1 being different from the mounting support according to FIGS. 2 and 3. As shown in FIG. 6, a positioning means in the form of an insertion device 41 is placed into the mounting support, for accommodating a computing device 42. Insertion device 41 is supported rotatably on an axis 46 in mounting support 44. When car radio 1 is in insertion compartment 2, insertion device 41 holds computing device 42 in a position of rest 45 in mounting support 11 that is drawn in as a broken line, a display 43 situated on computing device 42 being held parallel to upper side 10 of car radio 1. When car radio 1 is slid out of insertion compartment 2, insertion device 41 rotates about axis 46 counter to drawn-in arrow direction 48, and raises computing device 42 so that a surface of display 43 is at this point positioned perpendicular to upper side 10 of car radio 1. A user is now able to read off the information shown on display 43. Display 43 may be implemented as a touch-sensitive display face, by which the functions of computing device 42 are able to be controlled. In one specific embodiment, after sliding out drawer 1, one may also control the functions of computing device 42 using operating elements 4, 4' on front panel 26 of car radio 1. Insertion device 41 has detention means not shown in FIG. 6, which hold insertion device 41 along with computing device 42 in the position shown in FIG. 6, perpendicular to upper side 10. The detention means may, for example, be released by a slight tilting beyond the detention point of computing device 42 along with insertion device 41, so that computing device 42 is able again to flap into position of rest 45 drawn in as a broken line. It is also possible to make it flap in automatically, using a motor-actuated drive of axis 46. Besides a positioning of 90° with respect to upper side 10, smaller positioning angles, such as between 50° and 90° with respect to upper side 10 are also possible. In an additional specific embodiment, computing device 42 may also be flapped out of position of rest 45 by the user. For this purpose, depressions 47 are placed laterally at mounting support 44 on both sides into the housing of the car radio, through which an edge of computing device 42 may be grasped by a user, so that computing device 42 together with insertion device 41 may be moved into the viewing position according to FIG. 6. Electrical contacting of computing device 42 is accomplished via contacts situated in insertion device 41. In one embodiment, insertion device 41 is exchangeable, so that it is adaptable to various portable computing devices.

What is claimed is:

1. A mounting support, in a vehicle, for a portable computing device having at least one of a keyboard and a video screen, the mounting support comprising:
   a drawer slidably movable relative to a housing such that the drawer is substantially enclosed within the housing in a closed position, the drawer having an upper surface including a depression;
   wherein the computing device is adapted to be situated within the depression and completely covered when the drawer is in the closed position relative to the housing, and wherein the drawer houses a driver information device.

2. A mounting support, in a vehicle, for a portable computing device having at least one of a keyboard and a video screen, the mounting support comprising:
   a drawer slidably movable relative to a housing such that the drawer is substantially enclosed within the housing in a closed position, the drawer having an upper surface including a depression;
   wherein the computing device is adapted to be situated within the depression and covered when the drawer is in the closed position relative to the housing, and wherein the drawer houses a driver information device, wherein the drawer includes operating elements via which the computing device can be controlled.

3. The mounting support of claim 2 further comprising:
   electrical contacts coupled to the shelf for electrically coupling the computing device.

4. The mounting support of claim 3, wherein the electrical contacts enable data transmission.

5. A mounting support, in a vehicle, for a portable computing device having at least one of a keyboard and a video screen, the mounting support comprising:
   a drawer slidably movable relative to a housing such that the drawer is substantially enclosed within the housing in a closed position, the drawer having an upper surface including a depression:
   wherein the computing device is adapted to be situated within the depression and covered when the drawer is in the closed position relative to the housing, and wherein the drawer houses a driver information device, wherein the drawer has a front panel that includes an operating element for enabling a motor-actuated opening of the drawer.

6. A mounting support, in a vehicle, for a portable computing device having at least one of a keyboard and a video screen, the mounting support comprising:
   a drawer slidably movable relative to a housing such that the drawer is substantially enclosed within the housing in a closed position, the drawer having an upper surface including a depression;
   wherein the computing device is adapted to be situated within the depression and covered when the drawer is in the closed position relative to the housing, and wherein the drawer houses a driver information device, wherein the computing device includes flaps and is configured in the drawer such that at least one of the video screen and the flaps of the computing device open automatically when the drawer is opened.

7. The mounting support of claim 6, further comprising:
a positioning means for positioning the computing device, the positioning means being rotatable such that when the drawer is opened, the computing device rotates out of a position of rest in the drawer.

8. A computing device for insertion into a mounting support, the mounting support including a slidably movable drawer having an upper surface including a depression, the computing device comprising:
  electrical contact elements electrically coupled to operating elements situated on the drawer;
  wherein, when the computing device is inserted into the drawer and the drawer is pushed in, the computing device is operable via the operating elements situated on the drawer.

9. A mounting support, in a vehicle, for a portable computing device having at least one of a keyboard and a video screen, the mounting support comprising:
  a drawer slidably movable relative to a housing such that the drawer is substantially enclosed within the housing in a closed position, the drawer having an upper surface including a depression, and the drawer being closed by being pushed into an installation compartment in the vehicle;
  wherein the computing device is adapted to be situated within the depression and completely covered when the drawer is in the closed position relative to the housing, and wherein the drawer houses a driver information device.

10. The mounting support as recited in claim 9, wherein the installation compartment is situated in a middle console of the vehicle.

* * * * *